United States Patent Office

Re. 26,401
Reissued June 4, 1968

26,401

REMOVAL OF SATURATED CARBONYLS FROM UNSATURATED NITRILES BY pH-CONTROLLED DISTILLATION

Donald G. Stevens, Arthur F. Miller, and Gerald E. King, by The Standard Oil Company, a corporation of Ohio, assignee No Drawing. Original No. 3,185,636, dated May 25, 1965, Ser. No. 174,292, Feb. 19, 1962. Application for reissue Sept. 22, 1967, Ser. No. 675,264
2 Claims. (Cl. 203—6)

Matter enclosed in heavy brackets [ ] appears in the original patent but forms no part of this reissue specification; matter printed in italics indicates the additions made by reissue.

*ABSTRACT OF THE DISCLOSURE*

*A method for removing saturated carbonyls from acrylonitrile or methacrylonitrile by absorbing the reaction products from the ammoxidation of an olefin in an aqueous solution at a pH of 6.5 to 8.5, distilling the nitrile overhead with cyanhydrins. The cyanhydrins are formed by the combination of the saturated carbonyls and the hydrogen cyanide. The cyanhydrins in the overhead are stabilized by maintaining a pH of 2 to 5 of the overhead by the addition of an acid to the overhead and then distilling the nitrile overhead from the acid stabilized cyanhydrin.*

This invention relates to the purification of unsaturated nitriles such as acrylonitrile and methacrylonitrile, to separate them from small amounts of saturated carbonyl compounds.

When an olefin, such as propylene or isobutylene is reacted with ammonia and oxygen to produce the corresponding unsaturated nitriles such as acrylonitrile or methacrylonitrile, there is also produced substantial amounts of hydrogen cyanide and trace amounts of carbonyl compounds of relatively low molecular weight, such as acetaldehyde, propionaldehyde, acrolein, methacrolein, acetone, methyl ethyl ketone, etc.

The separation of the unsaturated carbonyl compounds, when they are present in trace amounts, presents no problem since these are homo-polymerizable under the normal distillation conditions and do not require any treatment, treating step, or treating agent in order that they may be separated from the unsaturated nitrile. The acrolein, for example, without treatment, readily dimerizes to the water-soluble dimer and does not go overhead when acrylonitrile is distilled but remains in the waste water from the absorber.

The saturated carbonyl compounds, however, present troublesome purification problems, because they do not polymerize. In accordance with this invention, these saturated carbonyl compounds can be effectively separated from the unsaturated nitrile so that the latter can be recovered substantially free from saturated carbonyl compounds, i.e., less than a total of 300 parts per million maximum and generally well under 100 parts per million.

In accordance with this invention, it has been discovered that if the reaction products from the ammoxidation of an olefin, ammonia and molecular oxygen are absorbed in water, which is maintained at a substantially neutral or slightly alkaline pH, such as a pH of 6.5 to 8.5, the saturated carbonyl compounds combine with the excess hydrogen cyanide to form the corresponding cyanhydrin. If the unsaturated nitrile recovered from this aqueous solution is then kept in acid condition, i.e., as a pH of 5 or less, the cyanhydrins formed in the previous step are stabilized and do not decompose to hydrogen cyanide and the corresponding saturated carbonyl during the subsequent purification steps. The stabilized cyanhydrins boil much higher than the unsaturated nitrile and the latter can, therefore, effectively be distilled from them.

Unless these saturated carbonyls are combined in the form of the cyanhydrins under conditions leading to the conversion of substantially all of the carbonyls to the cyanhydrin form and the cyanhydrins then stabilized and retained in this form, troublesome separation problems arise. More particularly, the cyanhydrins decompose to hydrogen cyanide and the corresponding saturated carbonyl under some operating conditions, and recombine to form the cyanhydrin under other conditions so that it is difficult to eliminate the carbonyls.

The conversion of the saturated carbonyls to the cyanhydrin by maintaining neutral or slightly alkaline conditions can be accomplished in any of a number of ways. The amount of ammonia in the reactor effluent can be adjusted so that a pH of 6.5 to 8.5 is maintained in absorber water. If, however, the products are quenched with water at a lower pH, the absorber solution can have its pH elevated by the addition of any alkaline compound, such as sodium carbonate. The means by which the absorbing solution is maintained within the pH range of 6.5 to 8.5 is not critical and any method of accomplishing it, as long as the pH range is achieved, is contemplated within the invention.

The unsaturated nitrile is distilled from the aqueous absorbing solution and any cyanhydrins which are removed overhead along with the acrylonitrile and then stabilized by the addition of an acid to the acrylonitrile stream. Any acid may be used, such as phosphoric acid, sulfuric acid, acetic acid, etc., so as to maintain the pH of the acrylonitrile within the range of 2 to 5.

In accordance with the invention, the acrylonitrile can be distilled overhead as a pure product and all of the stabilized saturated carbonyls in the form of cyanhydrins remains in the bottoms from the fractionating column and can be continuously or periodically withdrawn.

The invention will be described hereinafter in connection with the purification of acrylonitrile, such as made by the reaction of propylene, ammonia, and air and more particularly, the purification of acrylonitrile to separate it from saturated carbonyl of which acetone is one of the principal components and the most troublesome for separation.

Soichiometric amounts of propylene, ammonia and air to form acrylonitrile are fed to a reactor containing an oxidation catalyst at an elevated temperature and the reactor effluent contains 3.99% acrylonitrile, 0.77% hydrogen cyanide and 0.02% acetone and acetaldehyde (about 0.5% based on the acrylonitrile). The balance is nitrogen from the air, unreacted oxygen, propylene and ammonia, together with carbon dioxide, water and such other components which do not have any effect upon the recovery process herein described.

The reactor effluent, at a temperature of about 850° F., is quenched in water maintained at a pH within the range of 6 to 6.5 to neutralize any unreacted ammonia and the solution is fed to an absorbing column in which the acrylonitrile is distilled overhead. In this column enough sodium carbonate is added and, if required, to maintain the pH of 6.5 to 6.8. The acrylonitrile is distilled overhead from the aqueous solution together with 0.15% of acetone and acetaldehyde, as cyanhydrins of hydrogen cyanide based on the acrylonitrile, and immediately upon condensation there is added sufficient phosphoric acid to maintain a pH of 4.8. The product is then further distilled, dried and finally purified by distillation in the presence of phosphoric acid to maintain a pH of 5. The final product has less than 60 parts per million of acetone and acetaldehyde free or as the cyanhydrins.

We claim:

1. A process for purifying an unsaturated nitrile selected from the group consisting of acrylonitrile and methacrylonitrile, which is contaminated by substantial amounts of hydrogen cyanide and trace amounts of saturated carbonyl compounds selected from the group consisting of acetaldehyde, propionaldehyde, [acrolein, methacrolein,] acetone, and methyl ethyl ketone, which comprises absorbing said unsaturated nitrile in an aqueous solution at a pH of 6.5 to 8.5 whereby the saturated carbonyls form cyanhydrins with the hydrogen cyanide, distilling as overhead the unsaturated nitrile with at least a part of the cyanhydrins from the absorbing solution, stabilizing the cyanhydrins remaining in the unsaturated nitrile collected as overhead by maintaining the unsaturated nitrile at a pH of 2 to 5 by the addition of acid thereto, and distilling the unsaturated nitrile overhead from the acid stabilized cyanhydrins.

2. A process for purifying acrylonitrile which is contaminated by substantial amounts of hydrogen cyanide and trace amounts of acetone, which comprises adding sodium carbonate to an aqueous absorbing solution of the abovementioned mixture to achieve a pH of 6.5 to 8.5, whereby the acetone forms a cyanhydrin with the hydrogen cyanide, distilling as the overhead the acrylonitrile with at least a part of the cyanhydrin from the aqueous solution, and stabilizing the cyanhydrin in the acrylonitrile collected as overhead by adding an acid to the acrylonitrile to achieve a pH range of 2 to 5, and distilling the acrylonitrile overhead from the stabilized cyanhydrin.

References Cited

The following references, cited by the Examiner, are of record in the patented file of this patent or the original patent.

UNITED STATES PATENTS

| | | | |
|---|---|---|---|
| 2,175,805 | 10/1939 | Jacobson. | |
| 2,416,624 | 2/1947 | Hansley | 202—57.1 |
| 2,444,175 | 6/1948 | Teter et al. | 260—465.3 |
| 2,555,798 | 6/1951 | Kropa | 202—57.1 |
| 2,793,227 | 5/1957 | Sadle. | |
| 2,827,423 | 3/1958 | Carpenter. | |
| 3,005,517 | 10/1961 | Idol et al. | 260—465.3 |
| 3,057,903 | 10/1962 | Nemec et al. | 260—465.6 |

WILBUR L. BASCOMB, JR., *Primary Examiner.*